United States Patent [19]

Larsen

[11] 4,237,553
[45] Dec. 2, 1980

[54] DATA PACKET MULTIPLEXING IN A STAGGERED FASHION

[75] Inventor: Arthur B. Larsen, Colts Neck, N.J.
[73] Assignee: Bell Telephone Laboratories, Incorporated, Murray Hill, N.J.
[21] Appl. No.: 973,181
[22] Filed: Dec. 26, 1978
[51] Int. Cl.³ .............................................. H04J 6/00
[52] U.S. Cl. ...................................... 370/89; 370/94
[58] Field of Search .............. 179/15 AL; 370/89, 90, 370/86, 94

[56] References Cited

U.S. PATENT DOCUMENTS

| | | | |
|---|---|---|---|
| 3,597,549 | 8/1971 | Farmer | 179/15 AL |
| 3,732,543 | 5/1973 | Rocher | 179/15 AL |
| 3,985,962 | 10/1976 | Jones | 179/15 AL |
| 4,071,706 | 1/1978 | Warren | 179/15 AL |
| 4,154,983 | 5/1979 | Pedersen | 179/15 AL |

Primary Examiner—David L. Stewart
Attorney, Agent, or Firm—Roy C. Lipton

[57] ABSTRACT

Communication between a plurality of data stations (100(1)-100(N)) serially interconnected by way of a line (101) arranged in a ring is provided by bit interleaved data packets. A control station generates framing signals to designate the start of each packet, staggering the packets so that only one packet header appears on the line at a time. Processing equipment (114) at each station monitors all the headers, seizing "empty" packets if the station has a data burst to send and reading the data burst if the packet is addressed thereto.

7 Claims, 5 Drawing Figures

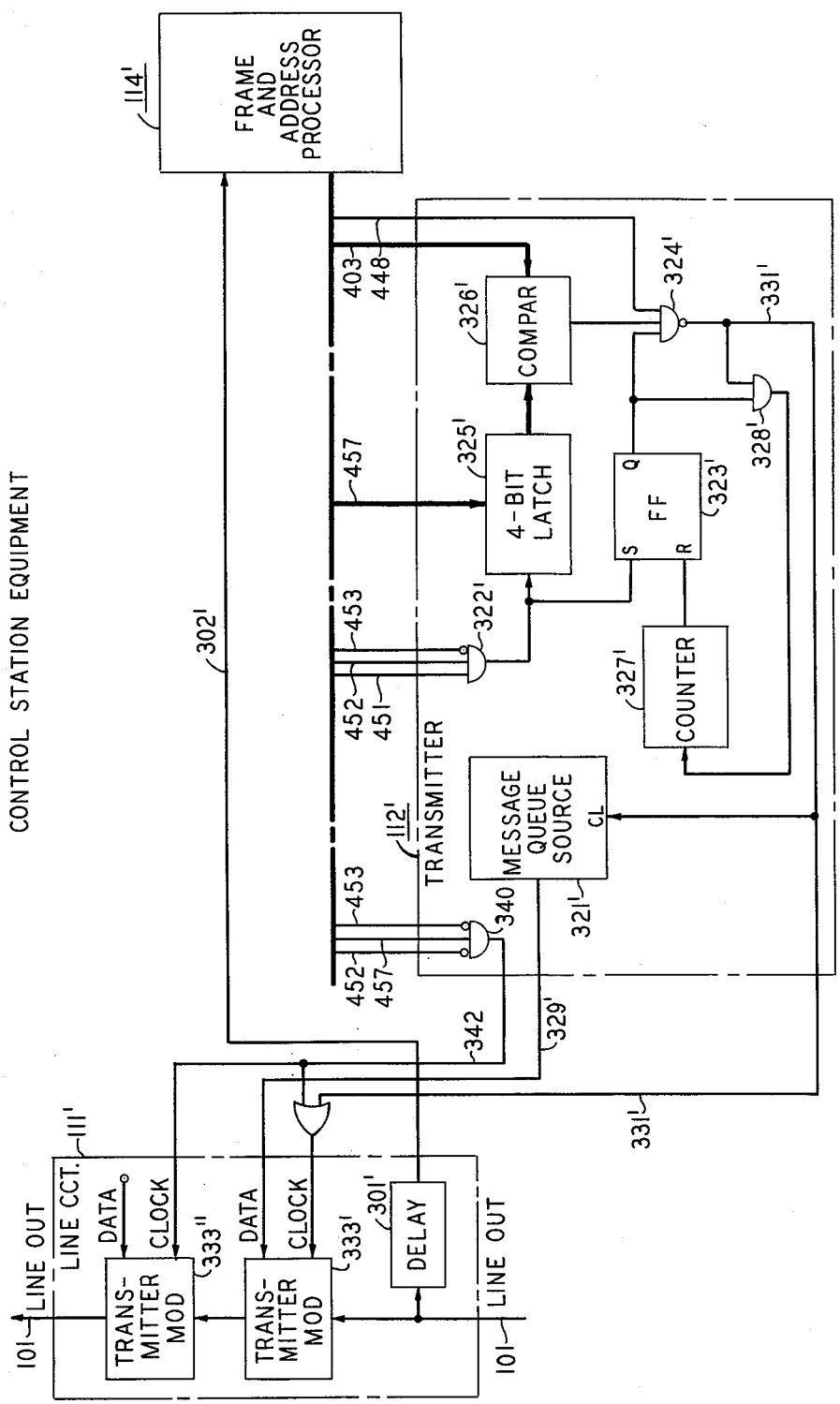

DATA PACKET MULTIPLEXING IN A STAGGERED FASHION

TECHNICAL FIELD

This invention relates to data packet communication systems and, more particularly, to transmission systems for communicating data packets on a time-division basis.

BACKGROUND OF THE INVENTION

The use of data packets is an advantageous format for conveying data messages from originating stations to designated or addressee stations. Data packets typically comprise a fixed number of data bits. Each packet is constructed to include a packet header portion which contains synchronizing or framing data identifying the start of the packet, address data defining the addressee station and other control data information which may include, for example, indications whether the packet is available and/or whether data information has been withdrawn from the packet. The packet is further structured to contain a data portion which accommodates a burst of data destined for the addressee station identified in the header portion.

When a station on a data packet transmission system desires to originate a message, it typically arranges the message into a plurality of data bursts, identifies data packets on the transmission line which are available for transmission, inserts the appropriate address information in the header portion of the available packet and inserts a data burst into the data portion. Advantageously, the originating station also inserts appropriate control information in the header, including information that the packet is now occupied and the data burst therein has not yet been withdrawn by the addressee station. This packet is then conveyed over the transmission system to the addressee station which identifies its own address in the header portion and thereupon withdraws the data burst from the data portion and indicates in the header portion that the packet is available for reuse.

Data packet communication systems have been employed in various different types of systems, one system being the ring or loop system described in "Network for Block Switching of Data" by J. R. Pierce, BSTJ 51, No. 6, July-August 1972, pp 1133-1145. In the Pierce arrangement, a transmission line serially passes from one to another of a plurality of stations arranged in a ring or loop configuration. Data packets are passed from station to station, each station monitoring the packet header to determine if the data burst in the packet is destined for that station. Alternatively, if the station has a message to send, it monitors the packet header to determine if the packet is available. Assuming, in this latter case, that the packet is in fact available, the station thereupon overwrites its address and control information into the packet header and overwrites a data burst into the packet data portion. When the packet arrives at the addressee station, the data burst is then withdrawn and the header information is modified to indicate that the packet is reusable.

In the Pierce arrangement, the packets serially follow one another on the ring. Although only a small proportion of the stations are necessarily involved in transmission at any time, they must monitor the header of each packet to determine if information is directed thereto. Of course, if they intend to send a message, they must also monitor each header to determine if the packet is available. The monitoring of these packet headers must, of course, be done at line speed, which either reduces the speed of the line to accommodate the reading speed of the monitor circuitry of the stations or requires high speed processing apparatus which is consistent with the speed of the loop.

It is understood that, by providing the expedient of time-division or multiplex signaling, a station on a loop may be arranged so that it need not insert or withdraw data at the normally high loop speed. In packet systems, the provision of time-division signaling can be implemented by interleaving each bit (or byte) in each packet with bits in the other packets. The structural format of the signaling system will thus comprise a frame of data constituting a sequence of bits individually obtained from all the packets. The next frame will then comprise a corresponding sequence of the next successive one of the bits from all the packets. An originating or addressee station might then identify a corresponding bit position or time slot in the frames to accommodate bits from the packet that it is sending or receiving and, upon such identification, insert or withdraw only the information in the one corresponding time slot of the several frames and therefore operate at the frame speed which is a fraction of the speed of the line loop. A ring system wherein a station inserts or withdraws data from one time slot of a frame is disclosed in U.S. Pat. No. 3,781,478 issued to D. E. Blahut and F. E. Froehlich on Dec. 25, 1973.

Although insertion and removal of data burst information in a time-division system can be accomplished at frame speed, the processing circuitry for monitoring packet headers cannot achieve this advantage simply by utilizing time-division signaling. A sending station searching for an available packet must monitor the frame and control information in the header of all packets and thus must examine all of the time slots in each of the frames. Accordingly, the processing circuit must scan each time slot in the frame and thus operate at the high line or loop speed. Correspondingly, the processing circuit must examine the address information in each packet header to determine if a packet is directed to that station. Accordingly, it is an object of this invention to provide a multiplexed or interleaved data packet communication system wherein processing circuitry may operate at frame speed rather than at the high loop speed.

SUMMARY OF THE INVENTION

In accordance with this invention, the initial or header portion of each of the interleaved data packets is positioned in exclusive ones of the frames whereby the header portions are staggered. The processing equipment is connected with the line during the corresponding time slots in the exclusive frames allocated to each header portion and therefore processes every header, one at a time, while operating at the frame speed and not the higher line speed.

In accordance with a feature of this invention, positioning the packet headers in staggered relationship is accomplished by a control station which writes, onto the line, framing signals to define the start of each packet. The framing signals are written into the corresponding time slot of at least (a first) one of the exclusive frames occupied by the intial portion of the packet. Each station recognizes the framing signals to align the processing equipment with the exclusive frames (occupied by each header).

In a specific embodiment of this invention described herein, the processing equipment at each station, aligned as described above, enables the reading out of information in the header of each packet. It is an advantage of this invention that each packet header may thus be monitored at frame speed. Thus, if the station has a message to send and the packet header includes data indicating that the packet is available, the sending station overwrites address and control information in the packet header and overwrites a data burst into the packet data portion, all at frame speed. If the packet is destined for the station, the station reads out its own address, overwriting control information in the header to indicate that it has received the data and records the data in the packet data portion, all at frame speed.

The foregoing and other objects and features of this invention will be more fully understood from the following description of an illustrative embodiment thereof taken in conjunction with the accompanying drawings.

BRIEF DESCRIPTION OF THE DRAWING

In the drawings:

FIG. 5 shows, in schematic form, the details of circuitry and equipment of a controller station arranged in accordance with this invention.

DETAILED DESCRIPTION

Figure 1:
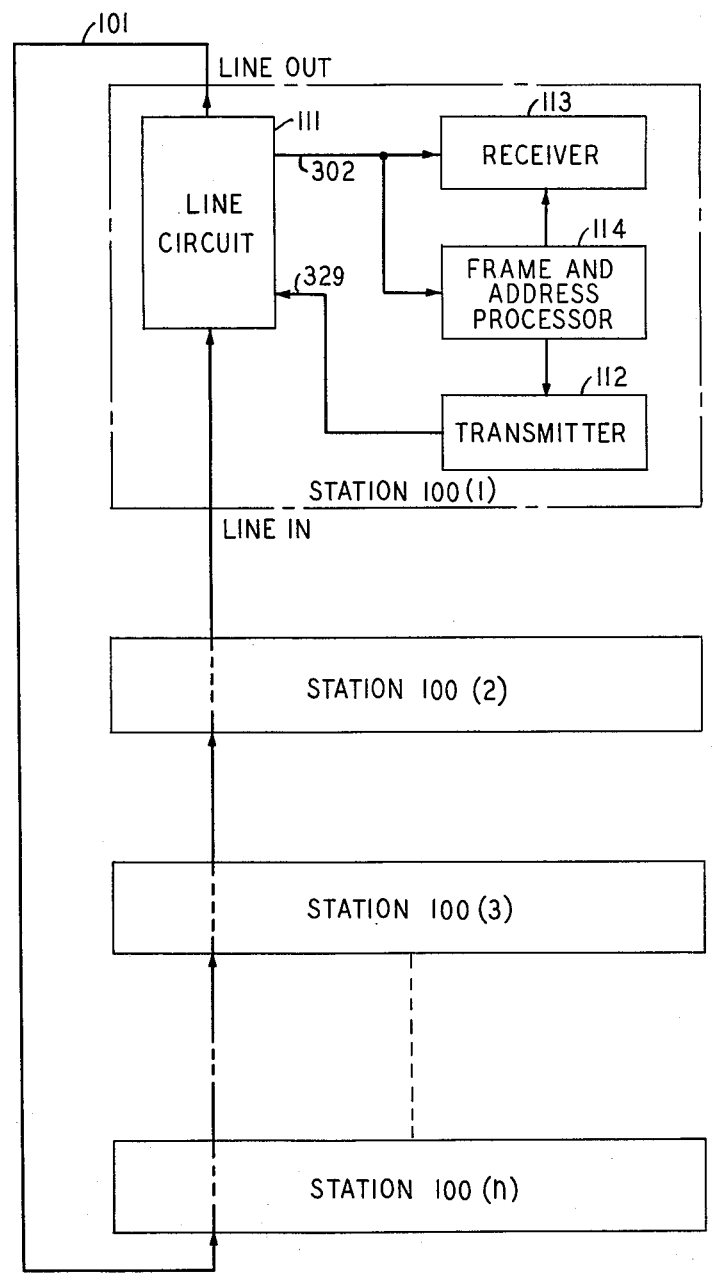
FIG. 1 shows in block form a ring or loop transmission system which includes stations arranged to communicate multiplexed staggered data packets in accordance with this invention.

The present invention is particularly useful in a data loop system, such as the system shown in FIG. 1. The data loop system comprises a data loop line, such as line 101, and a plurality of stations 100(1) through 100(N), the several stations being serially connected by way of line 101. In general, the station's function is to deliver messages to and accept messages from data line 101. The data loop system is also provided with a control station which can be incorporated in one of the stations 100(1) through 100(N) or may be a separate station in series with the data stations.

The data loop system, as shown in FIG. 1, is arranged to convey data information on line 101, which information is formatted by the control station into repetitive frames of data, each frame of data comprising a plurality of time slots, which specifically is nine time slots in this embodiment. Corresponding time slots in the several frames constitute a data channel, each data channel carrying the format of sequential data packets. With respect to each channel, each data packet comprises a fixed number of bits (specifically 288 in this embodiment), the packet being divided into a header portion of 32 bits and a data portion of the remaining 256 bits. The header portion of the data packet comprises a framing byte consisting of eight bits, two address bytes comprising 16 bits and a housekeeping byte of eight bits.

Figure 2:
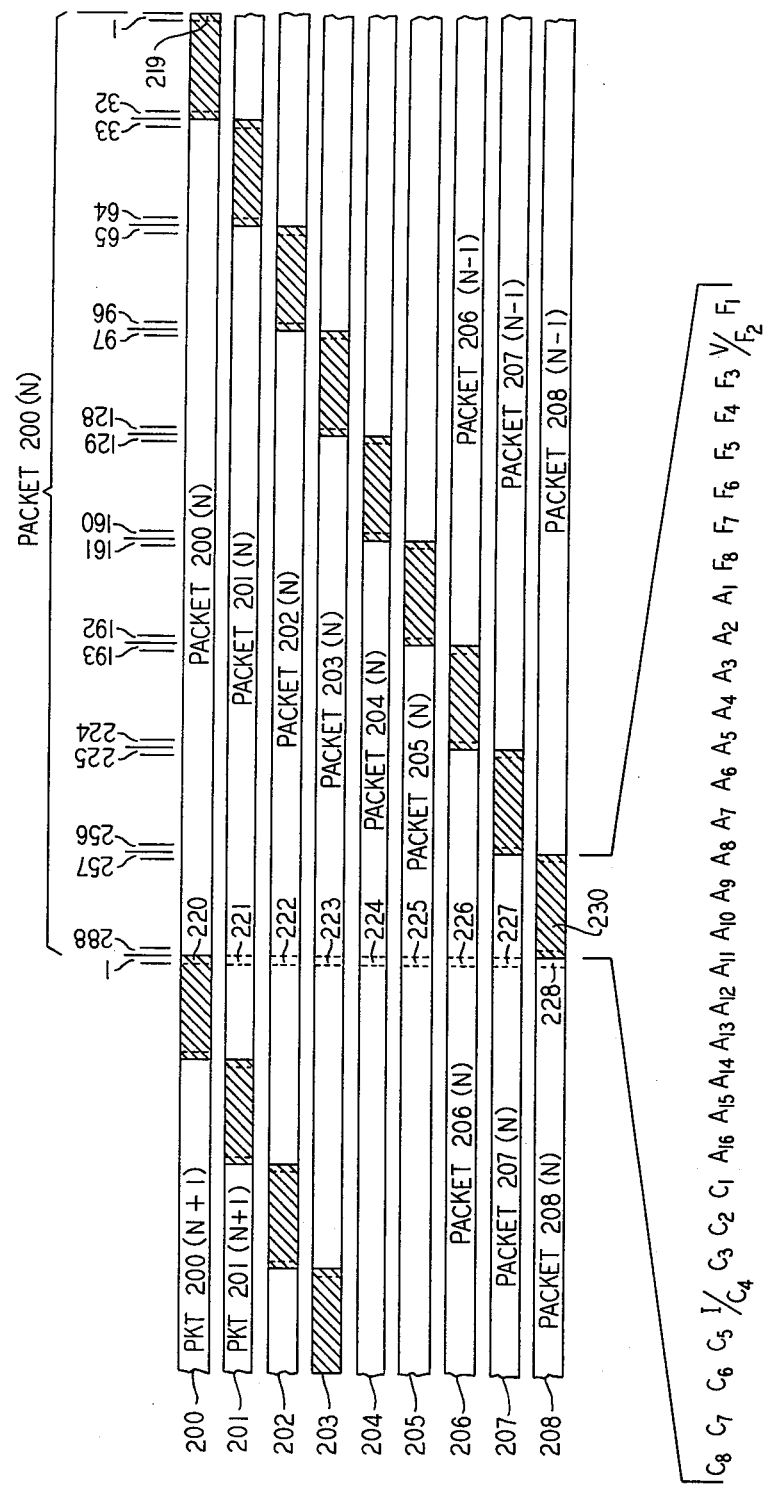
FIG. 2 depicts timing waves illustrating the multiplexed staggered data packet format.

FIG. 2 depicts the format of the data packets for each channel wherein data packets 200 comprise the sequential data packets of a first one of the channels and data packets 201–208 comprise the sequential data packets of individual ones of the other eight channels. The data packets of each channel are aligned by the controller station in a staggered fashion with respect to the data packets of the other channels. In order to explain the staggered packet multiplexing scheme utilized in this loop system in accordance with this invention, it is to be understood that, with respect to data packets 200, data packet 200(N) precedes in time data packet 200(N+1). Similarly, data packet 208(N−1) precedes in time data packet 208(N). It is to be noted that the shaded portion of each packet, such as packet 200(N), comprise bits 1–32, and these bits form the packet header. The remaining portion of the packet, namely bits 32–288, comprise the data portion.

In staggered multiplexing scheme a data bit from a first one of the channels is applied to line 101 followed by data bits from each of the other channels to make up a frame of nine bits, one bit from each channel. Accordingly, one frame comprises the first bit of packet 200(N+1), which data bit is identified as data bit 220, and this data bit period might constitute the first time slot in a data frame on line 101. The next successive bit applied to line 101 to thus form the second time slot of the frame would constitute data bit 221 and this data bit comprises the 257th bit of packet 201(N). The next seven time slots in the frame would then be occupied by data bits 222–228, it being noted that data bit 228 comprises the 33rd bit packet 208(N), (which data bit is the first bit in the data portion of the packet). The first time slot in the next frame of data on line 101 is then occupied by the second bit in packet 200(N+1) and the remainder of the frame would be similarly occupied by the next successive data bits in the channels. Thus, each frame comprises nine time slots, each time slot being occupied by a data bit from one of the channels, the data bit in any one channel being derived from a packet which is staggered with respect to the packet in any other channel. This staggering is advantageously arranged so that the header portion of any packet in any one channel does not occupy any frames which are correspondingly occupied by the header portion of any other packets in any other channel. In the format in accordance with FIG. 2, the header portion of any packet starts immediately after the header portion of a packet in a prior channel terminates, thereby using line 101 with the maximum number of packets and the maximum number of channels.

The protocol for the line loop system is contained in packet headers, each of the headers being initially arranged in substantially the same manner. The specific bits occupying a packet header, such as header 230, comprise the four bytes described above. The first byte of the packet header occupying bits F1-F8 is a sequence of bits called the framing byte, which sequence is invariable with the exception of the second bit to identify the first eight bits of the packet. The second bit (bit V/F2) designates whether the packet is full or empty. This bit position normally has a "0" bit therein to indicate that the packet is empty. When the packet is seized by a sending station to insert a data burst in the packet, it overwrites a "1" bit in the second bit position to indicate that the packet is full.

The next two bytes comprise bits A1–A16. These two bytes are reserved for the address of the designated station. The fourth byte is a housekeeping byte which circulates control information around the loop. This byte comprises bits C1–C8. The only bit of interest with respect to this information comprises the fourth bit I/C4, which is normally a "0" bit. A "1" bit is placed therein, however, when an addressee station reads the data information out of the packet to thereby indicate that the packet may be reused.

Each line station 100(1)–100(N) is equipped for storing data bursts for delivery to the packets on the line and further equipped for accepting and recording data bursts in the packets which are specifically directed to the station. In general, each line station monitors the incoming packet address and synchronizes the station circuitry with each header. The synchronization function includes aligning the station circuitry with the time slot of the channel conveying the packet header and also with the position of the data packet of that channel. These functions are principally provided by frame and address processor 114, which cooperates with line circuit 111 to thereby synchronize the station circuitry. Line circuit 111, in turn, functions to accept data from the incoming side of line 101, momentarily storing or delaying the data before passing the data on to the outgoing side of the line. Assuming the station circuitry is synchronized, as noted above, receiver 113 is arranged to detect the unique address of the station in the packet header and, upon detecting a packet header having this unique station address, to selectively read the corresponding time slots on the channel carrying the packet and to accept and record the data in the incoming packet. Transmitter 112 is arranged to detect empty packets on the line and when a data burst is stored therein and available for sending to another station to maintain and align the transmitter circuit with the time slots of the channel having the empty packet and inserting the data bursts in the data portion of this packet by overwriting the data into the appropriate time slots as they pass through line circuit 111. It is to be noted that the line station circuitry is advantageously arranged to provide the monitoring, synchronizing, detecting, reading and inserting functions at the relatively slow channel speed rather than the relatively high line speed. The circuitry for providing this advantage is described in further detail hereinafter.

The control station includes equipment for formatting the staggered multiplexed packet format and doing certain other housekeeping functions. The control station permanently stores a bit sequence for the header portion of a packet. This bit sequence is initially applied to the line for all channels to form the staggered format and applied thereafter to overwrite the existing packet header if the packet is empty, which overwrite inclues "0" bits in the second bit position (V/F2) of the header (full/empty bit) and the 28th bit position (I/C4) of the header. The control station also monitors these two bit positions. If both positions contain "1" bits, indicating that the packet has been occupied by data and then read out, the control station overwrites "0" into these two positions to permit the reuse of the packets.

Figure 3:
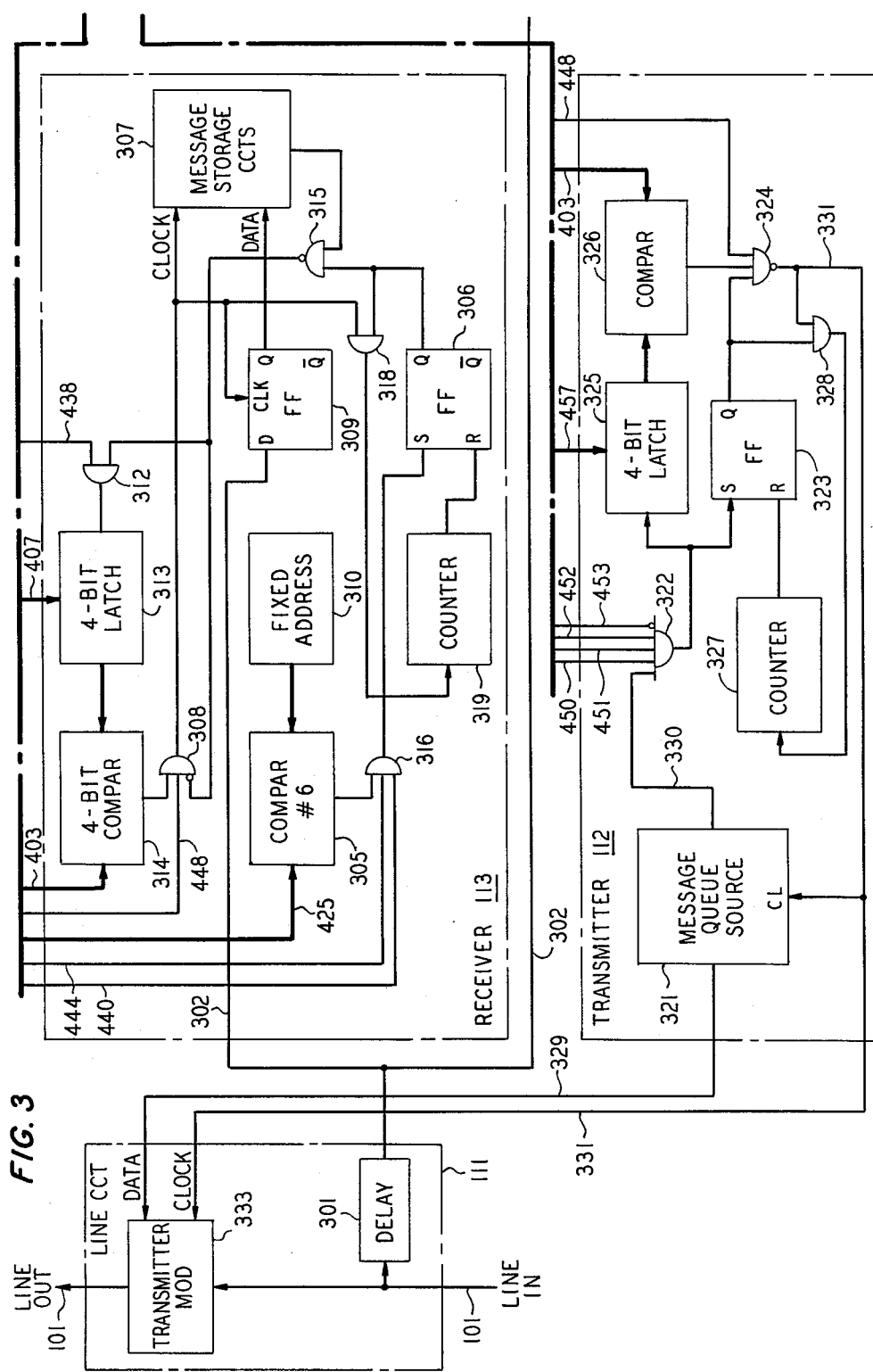
FIGS. 3 and 4, when horizontally aligned, disclose, in schematic form, the details of circuitry and equipment of a typical station arranged in accordance with this invention.
Figure 4:
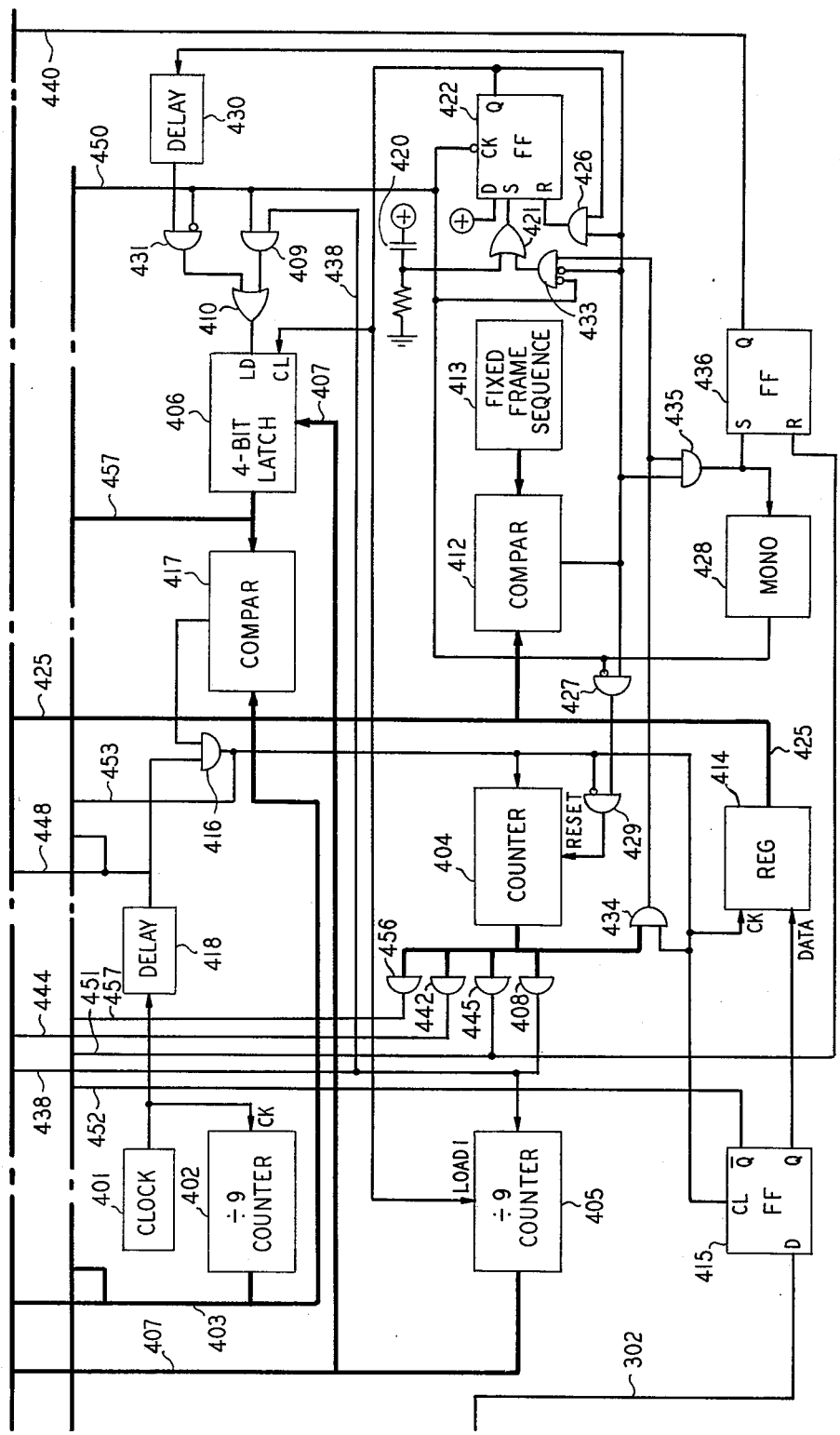

Refer now to FIGS. 3 and 4 showing details of a typical station. Clock signals for the station are provided by the common clock 401 in framing and processor circuit 114. Clock 401 is synchronized with corresponding clocks in the other stations, by means well known in the art, to provide an output clock signal at the line signal frequency.

The output of common clock 401 drives the counter 402. Counter 402 is a divide-by-nine counter which thereby provides a count of nine, which count is applied to its four output leads shown as cable 403. The output number of counter 402 therefore provides an individual count for each of the time slots in a frame, the counts thus identifying each of the nine channels in the frames of data on the line.

Counter 404 is a divide-by-32 counter and these 32 counts define the 32 bits in the header of each of the packets, as described hereinafter. Counter 404 will normally count the bits in a packet header in one of the channels. At the termination of the packet header, counter 404 achieves a count of 32 and restores to the zero count. Counter 404 then proceeds to count the bits in the packet header of the next successive channel.

Divide-by-nine counter 405 provides a four-bit output number which, when the circuit is "in frame", defines the number of the next successive channel whose header will be counted. This four-bit number is applied to four output leads depicted as cable 407. Counter 405 is advanced to the next count each time counter 404 restores to the zero count.

Latch 406 is a four-bit register which stores the number of the channel carrying the header whose bits are being counted by counter 404. After the bits of a header have been counted by counter 404 and the counter restores, a "restoration" pulse is normally developed at the output of zero count gate 408. This pulse is passed by gate 408 through normally enabled gate 409 and OR gate 410 to load the output number of divide-by-nine counter 405 on cable 407 into latch 406. The "restoration" pulse also advances counter 405 to the next higher count. Thus, latch 406 now stores the number of the next channel carrying the header whose bits are being counted by counter 404.

Framing of the station counters 404 and 405 is accomplished in part by comparator 412 which compares locally stored bits in fixed frame sequence 413 with the framing sequence of one of the channels received from the line and stored in register 414. A comparison should be achieved after the eight-bit framing sequence is received and counter 404 should have advanced to its ninth count. In this condition the station circuitry is in frame with the signals on the line.

The incoming signals on the line are passed through delay 301 and lead 302 to the D input of flip-flop 415. These incoming line signals are then clocked into the flip-flop by clock signals derived by way of gate 416. Gate 416, in turn, is enabled by comparator 417 to pass a clock pulse, delayed by delay circuit 418, when the count in counter 402 is identical to the number in latch 406. Thus, a clock pulse is passed by gate 416 when the time slot or channel count stored in latch 406 corresponds to the time slot or channel number on the line as defined by counter 402. The signals clocked into flip-flop 415 are thus derived solely from the time slot or channel defined by the number stored in latch 406. The gated clock signals also drive counter 404 so that counter 404 is advanced each time the channel defined by the stored number in latch 406 appears on the line.

In the initial condition, prior to framing, the turn-on of power provides a pulse via capacitor 420 and OR gate 421 to the set input of the initiate flip-flop 422. With the flip-flop set, the potential on the Q output clears latch 406 to the number "0000" and loads the four-bit number "0001" into counter 405. Each time counter 402 steps to the "0000" count, this corresponds to the number clamped in latch 406 and comparator 417 enables gate 416. A clock pulse from the common clock 401 and passed by delay 418 is thereby gated through gate 416 and this gated clock pulse clocks the incoming data in channel "0000" into flip-flop 415. At the same time, the gated clock pulse advances counter 404. Accordingly, the data inserted into flip-flop 415 is derived from the "0000" channel (corresponding to the number inserted into latch 406) and counter 404 is advanced once each incoming line frame and concurrently with the appearance of the "time slot" of the "0000" channel on the incoming line. At the same time, the incoming bits at the output of flip-flop 415 are shifted into 16-stage register 414, the bits being clocked in by the gated clock from gate 416. It is understood at this time that, since the station is not in frame, that counter 404 is not necessarily providing the correct header count for the packet in the "0000" channel.

The first eight stages of register 414 contain the last eight bits received from the "0000" channel. These last eight bits are passed via cable 425 to comparator 412 to be compared with eight bits of the framing sequence stored in the fixed frame sequence circuit 413. When a framing sequence is received from channel "0000", comparator 412 will detect a match and thereby generate an enabling pulse. This enabling pulse passes through gate 426 (enabled by the Q output of flip-flop 422) to reset the initiate flip-flop which, in turn, removes the clamps on counter 405 and latch 406. In addition, the comparator 412 enabling pulse is applied to gate 427, gate 427 being normally enabled by the inverted output of monopulser 428. As a consequence, the enabling pulse output of comparator 412 is passed through gate 427 to enable reset gate 429. The reset gate, enabled, thereupon passes the inverted second half of the gated clock pulse from gate 416. The passage of the second half of the clock pulse through gate 429 loads counter 404 with the count of eight. Since the count number in latch 406 is "0000", the frame sequence has just been received from this channel and counter 404 is at the count of eight (the ninth count), the station is in frame with the incoming packet.

A short interval after the generation of the comparator 412 enabling pulse, as determined by delay 430, the enabling pulse is passed to gate 431. Gate 431 is enabled by the inverted output of monopulser 428 and thus passes the enabling pulse through the OR gate 410 to load the "0001" number in counter 405 into latch 406. Counter 404 now advances, from the count of eight, each frame concurrently with the appearance of the time slot of the "0001" channel on the line. The counter continues its count to 32 and restores, which restoration occurs at the end of the "0000" channel header and therefore at the beginning of the "0001" channel header, assuming that the counter was properly set to "8" by the framing sequence of the "0000" channel. The restoration pulse of counter 404 now advances counter 405 to the next count, which in this case is the count of "0010". The count in latch 406 is still "0001" and the bits of the "0001" channel are read into flip-flop 415 and then into register 414, which bits constitute the "0001" channel framing sequence if the "0000" channel framing sequence was properly read and counter 404 properly set to the count of "8".

If the "0000" channel framing sequence is not properly read and/or counter 404 is not properly set to the count of "8", the counter will not achieve a count of "8" when the "0001" channel framing sequence is read. In this event, gate 433 is enabled by the low outputs of comparator 412 and monopulser 428, inverted. At this time, gate 434 is enabled by counter 404 achieving the count of "8" and the gate passes the gated clock pulse from gate 416. This gated clock pulse is passed through gate 433 and OR gate 421 to the set input of initiate flip-flop 422 and the setting of the flip-flop reclamps the "0000" number into latch 406 and the "0001" number into counter 405 to reinitiate the reframing of the circuit.

Assume now that the frame sequence of the "0000" channel has been properly read and the counter 405 properly set to the count of eight. When the counter restores to "zero", the framing sequence at the beginning of the packet in the "0001" channel is clocked into register 414. When counter 405 achieves the count of eight, the full framing sequence has been read into the register and comparator 412 consequently provides an enabling pulse. This enabling pulse is passed through gate 435 whose other input is concurrently enabled by gate 434 since counter 405 has achieved the count of eight. Gate 435, enabled, triggers monopulser 428 and sets flip-flop 436. It is noted here, that flip-flop 436 advises the transmitter 112 that the packet frame sequence is correct, the flip-flop being reset by gate 445 which is enabled at count 2 of the next packet header.

Monopulser 428 comprises a retriggerable monopulser having a restoration time which is in excess of the duration of a packet header, which restoration time, for example, constitutes the duration of two full packet headers. Monopulser 428 is therefore triggered and does not time out and restore unless two successive packet headers do not contain an appropriate frame sequence.

The triggering of monopulser 428 provides a high condition at its output. This high condition now disables gates 427, 431 and 433 and enables gate 409. With gate 409 enabled, at the end of each packet header the restoration pulse of counter 404 at the output of gate 408 passes through gate 409 and through the OR gate 410 to insert the new counter 405 number into latch 406. The restoration pulse now advances counter 405 to the next higher count. This cycle continues for each packet header so long as a framing sequence is detected in each packet header whereby monopulser 428 is retriggered by comparator 412 before its time out. Gate 409 is thus maintained enabled to pass the restoration pulse output of gate 408 at the termination of each packet header, the count number output of counter 405 is inserted into latch 406 and the count of counter 405 is advanced to the next count. The framing circuit thus sequentially defines the number of each of the successive channels, applies the data bits of a present one of the channels to register 414 while the packet header of that channel is being received and advances counter 404 to count the bits of the packet header, monitoring the fact that the framing sequence in the initial portion of the packet header is being correctly received.

In the event that the framing sequences from two successive packet headers are not correctly received, monopulser 428 is not retriggered and thereby restores. The restoration of monopulser 428 provides an inverted transition to the clock input of initiate flip-flop 422, clocking the flip-flop to the set condition. At the same time, monopulser 428 disables gate 409 and re-enables gates 427, 431 and 433. The setting of flip-flop 422 again clamps the "0000" number into counter 405. A new reframing sequence is thus initiated.

A station accepts a packet from the line when it reads its own address in the packet header and it has available storage space to store the packet. Upon reading its own address, comparator 305 in receiver 113 of the station is enabled to set flip-flop 306. If storage space is available in the message storage circuits 307, gate 308 provides clock pulses to the message storage circuits coincident with the appearance of the time slots of the packet containing the station address, enabling the message storage circuits to accept the serial bits of the packet from flip-flop 309 which is concurrently clocking the bits in from the line.

It is recalled that the bits of each header are clocked into 16-stage register 414. These bits (16 at a time) are applied to comparator 305 via cable 425. Comparator 305 compares these 16 bits with the 16 bits defining the station's address derived from the fixed address circuit 310. Thus, comparator 305 is enabled when a packet header contains the 16-bit address which is unique to this station.

At the start of the packet header, counter 404 resets to the count of "0", as previously described. This provides a pulse through the counter gate 408, which pulse loads latch 406 with the next number and advances counter 405. In addition, this pulse is passed through lead 438 and through gate 312 which is normally enabled by NAND gate 315. The pulse passed through gate 312 inserts the count on the output leads of counter 405 in cable 407 into the four-bit latch 313. The latch therefore contains the number of the channel whose header is about to be received. It is thus noted that the number just inserted into latch 313 is identical to the number just inserted into latch 406 at the start of a packet header (under the condition that the station is not presently receiving a message).

The output of latch 313 is applied to comparator 314 which compares this number with the number in the counter 402 as defined in the counter output leads 403. Comparator 314 is therefore enabled each time the time slot of the packet whose header is being read appears on the incoming line and this enabling pulse is passed to normally disabled gate 308.

It is recalled that the address of the destination station is contained in the 9th through 24th bits of the packet header. Comparator 305 therefore appropriately finds a match and is therefore enabled when the 24th bit of the packet addressed to the station is received by register 414, partially enabling gate 316. Assuming that the packet contains its correct frame sequence, gate 435 is enabled, as previously described, and this sets flip-flop 436. The setting of this flip-flop now applies a further enabling signal via lead 440 to gate 316. Concurrently therewith, counter 404 achieved the count of 24 and enables gate 442. The gate 442 therefore fully enables gate 316 and this enablement sets flip-flop 306.

The setting of flip-flop 306 provides enabling potentials to NAND gate 315 and to gate 318. Assuming storage space is available in message storage circuits 307, gate 315 is fully enabled and disables gate 312 while enabling gate 308. The disabling of gate 312 precludes the insertion of new numbers in latch 313 whereby comparator 314 will continue to be enabled each time a time slot of this present packet appears on the line. This then enables gate 308 for each time slot of this present packet, passing a clock pulse on lead 448 from delay 418 to the clock inputs of flip-flop 309 and the message storage circuits 307.

The D input of flip-flop 309 receives line signals by way of delay 301. The clock pulse output of gate 308 therefore clocks into flip-flop 309 the bits of the packet destined for this station. The Q output of flip-flop 309 is extended to message storage circuits 307 whereby the incoming packet is inserted thereto by the output clock pulses of gate 308 and stored by the message storage circuits. Thus, the message storage circuits 307 will receive the remaining portion of the packet, starting with bit 25 in the packet header. Advantageously, on the enabling of gate 315 and the passing of the packet into the message storage circuits, the clock signal output of gate 308 provided for reading this packet may also be used by circuitry (not shown) to insert a "1" bit into the transmitter modulator and thereby onto the line. This "1" bit would be inserted into the fourth bit postion of the fourth byte in the header, previously described, to indicate to the controller station that the packet has been received. Thus, the station signals the controller station that it has received the packet and the subsequent bits of the packet are clocked into the message storage circuits.

As previously described, the setting of flip-flop 306 enables count gate 318. The count gate 318, thus enabled, passes the clock pulses at the output of gate 308 into counter 319. The counter 319 is arranged to be advanced to the count of 264 at which time the last bit of the incoming packet is being received. The counter thereupon restores and this restoration resets flip-flop 306. The resetting of flip-flop 306 disables count gate 318 to terminate counting and disables NAND gate 315. The disabling of gate 315 disables clock gate 308 to terminate the clocking of data into flip-flop 309 and the insertion of data into the message storage circuits 307. The disabling of gate 315 also enables gate 312. With gate 312 enabled, latch 313 again follows the count number in counter 405.

Each station queues up data packets for application to the line in message queue source 321, which queue source may advantageously include a multistage shift register. When a data packet is available in source 321, the station is arranged to pass the packet to the line when a line channel packet is empty. In the event that these conditions are satisfied, gate 322 in the transmission circuit 112 sets the transmitter flip-flop 323. This enables the transmitter gate 324 to clock the data out of the message queue 321 and onto line 101 in the time slot of the channel having the empty packet.

Inputs to gate 322 include lead 450 which is connected to the output of monopulser 428, lead 330 which has an enabling potential placed thereon by message source 321 when a data packet is available therein, lead 451 which is connected to the output of gate 445 and lead 452 which is connected to the $\overline{Q}$ output of flip-flop 415. As previously described, the counter 404 provides the packet header bit count of the several packets on the line. When the second bit of the packet header appears on the line, counter 404 advances to the corresponding count enabling gate 445 and this gate provides an enabling potential to lead 451. If a line channel has an empty packet, the second bit of the empty packet is a "0" bit indicating that the packet is empty. This "0" bit is applied to the D input of flip-flop 415 to drive the flip-flop to the "clear" condition. In this clear condition, the $\overline{Q}$ output of the flip-flop applies an enabling condition to lead 452. Thus, if a data packet is available and if a channel has an empty packet as indicated by a "0" bit therein when counter 404 advances to the "1" count, gate 322 is fully enabled. Gate 322 thereupon passes, inverted, the clock pulse on lead 453 from gate 416 to set the transmitter flip-flop 323.

The gated clock pulse also inserts the number presently in latch 406 (and on cable 457) into latch 325. It is recalled that the latch 406 count constitutes the number of the channel whose header is being read and that this channel is carrying the empty packet. Thus, the number of this channel is inserted in latch 325.

The setting of the transmitter flip-flop 323 partially enables NAND gate 324 and also enables count gate 328. NAND gate 324 is fully enabled by the enabling of comparator 326. The inputs to comparator 326 comprise the output number provided by counter 402. Comparator 326 is therefore fully enabled to fully enable, in turn, gate 324, when the time slot of the channel having the empty packet appears on the line. Gate 324, thus enabled, passes the clock pulse at the output of delay 418 and on lead 448 to gate 328, to the clock input of queue source 321 and additionally to the clock input of transmitter modulator 333.

Transmitter modulator 333 advantageously comprises a multistage shift register arranged to accept at one end thereof the line signals from the incoming side of the line to shift the line signal therethrough at the line signaling rate, which therefore comprises the clock output rate of clock 401 and to apply the signals shifted to the other end of the register to the outgoing side of line 101. Transmitter modulator 333 also includes circuitry (not shown) for overwriting into an intermediate stage a data signal applied to input terminal "data" when clocked therein by a clock pulse applied to input terminal "clock". Accordingly, the clock pulse output of gate 324 on lead 331 clocks the data from queue source 321 on lead 329 into the intermediate state, the timing of the clock pulse being such that the data is clocked into the intermediate stage at the moment that data from the time slots of the channel having the empty packet is shifted into the intermediate stage.

The clocking of the data into transmitter modulator 333 is initiated at the time that the first bit position of the channel packet header is being shifted into the intermediate register stage. Queue source 321 is advantageously arranged to change the second bit of the header to a "1" bit to indicate that the packet is now full. In addition, queue 321 inserts the address of the addressee station into the 9th through 24th bits of the packet header. After the final header housekeeping byte (header bits 26-32) pass through the register stage, message data is then clocked into the data portion of the packet to overwrite data into the 33rd through 288th bits of the packet.

As previously noted, the clock pulse is also passed to the gate 328 which passed the clock pulse of gate 324 to transmitter counter 327. The transmitter counter is advanced to the count of 288, whereupon it is restored at the time the last data bit of the packet is clocked into transmitter modulator 333. This restoration resets transmitter flip-flop 323. The resetting of the transmitter flip-flop disables gates 324 and 328. The disabling of gate 324 terminates the clocking of data into transmitter modulator 333. The disabling of gate 328 precludes the advancement of counter 327. The transmitter circuit is now in its initial condition and available to send another packet to the line.

The control station equipment for forming the format and providing housekeeping is shown in FIG. 5. The equipment includes line circuit 111', frame and address processor 114' (which is substantially identical to frame and address processor 114) and transmitter 112'. Transmitter 112' includes a queue source 321' corresponding to message queue source 321 but modified to permanently store the packet header format for the transmission system.

Operation of the control station source is initiated by the enabling of gate 322' corresponding to gate 322 which has input leads 451, 452 and 453. Thus, the gate 322' is enabled in the second bit position of the header when the position has a "0" bit. This condition exists when the packet is "empty". Of course, to initiate the system, "0" bits may be applied manually by grounding lead 452. In either event, the clock pulse of lead 453 is thereupon passes through gate 322' to set flip-flop 323', enabling gate 324' when the first time slot of the packet header is passing through an intermediate stage of transmitter modulator 333'. The clock pulses on lead 448 thereby pass through gate 324' to first clock out the framing sequence bits from source 321' to intermediate stage of transmitter modulator 333' corresponding to the time slots of the frames assigned to the data packet which is presently being initiated. This framing sequence includes a "0" bit in the second bit position. The remaining portion of the header provided by source 321' comprises "0" bits in the bit positions of the address and control bytes. The enabling of gate 324' also clocks counter 327'. In this case, counter 327' restores at the count of 32 at the time the last data bit of the packet header is clocked into transmitter modulator 333'. This resets flip-flop 323' which disables gate 324'. The clocking of the header bits into transmitter modulator 333' is therefore terminated and the header for an "empty" packet thus has been inserted in the appropriate time slot of those frames exclusively set aside for the packet header.

Interrogation of the 28th (I/C4) header bit is provided by gate 340. Gate 340 is enabled by a "1" bit in the I/C4 bit position indicating that the packet has been read out by the addressee station. Enabling of gate 340 is provided by a "1" bit on lead 457, which occurs on the count of 28 of counter 404 to enable gate 456, and by a "0" bit on lead 452, which occurs when a "1" bit on the line sets flip-flop 415. Gate 340 thereupon passes the clock pulse on lead 453, which pulse is passed through lead 342 to the clock inputs of transmitter modulators 333' 333". At the same time no input (or "0" bit inputs) are applied to the data inputs of the transmitter modulators.

The application of the gate 340 pulse to transmitter modulator 333' inserts a "0" bit in the 28th bit position of the header overwriting the "1" bit in the I/C4 bit position. Transmitter modulator 333" provides a sufficient delay so that the second bit position is presently passing through an intermediate stage. The application of the gate 340 pulse therefore overwrites a "0" bit in this position, replacing the "1" bit in the V/F2 position. The packet header now indicates that it is empty and therefore reusable.

I claim:

1. In a transmission system conveying frames of data carrying interleaved data packets (200(N)-208(N)), each frame having a plurality of time slots (220-228), each data packet occupying corresponding time slots of a plurality of frames,
characterized by
means (321', 322', 323', 324', 325', 326', 333') for positioning an initial portion of each of the packets in respectively exclusive ones of the frames, and means (402, 404, 405, 406, 414, 416, 417) for operatively connecting control equipment with the transmission system during the corresponding time slots of the exclusive frames occupied by the initial portion of each of the packets.

2. In a transmission system in accordance with claim 1 wherein the positioning means includes means (321', 333') for writing initial portion defining signals into the corresponding time slot of at least one of the exclusive frames occupied by the initial portion of each of the packets.

3. In a transmission system, in accordance with claim 2, including means (412, 413, 414, 415, 428) responsive to the initial portion defining signals for aligning the transmissively connecting means with the corresponding time slots of the exclusive frames.

4. In a transmission system, in accordance with claim 3, including means (305, 310, 322) responsive to the transmissively connecting means for reading signals out of at least one of the corresponding time slots of the exclusive frames.

5. In a transmission system, in accordance with claim 4, including means (325, 326, 323, 324, 333, 327, 319, 306, 308, 309) controlled by the reading means and responsive to reading predetermined signals in the at least one corresponding time slot of the exclusive frames occupied by the initial portion of a data packet for transmissively connecting communicating equipment with the transmission system during subsequent ones of the corresponding time slots occupied by the data packet.

6. In a transmission system, in accordance with claim 5, wherein the communicating equipment comprises transmitting equipment (321) for inserting signals in the subsequent corresponding time slots.

7. In a transmission system, in accordance with claim 5, wherein the communicating equipment comprise receiving equipment (307) for reading signals out of the subsequent corresponding time slots.

* * * * *